Patented Nov. 15, 1949

2,487,859

UNITED STATES PATENT OFFICE 2,487,859

SOLUTIONS OF POLYMERS OF ACRYLONITRILE

Joseph B. Dickey, Theodore E. Stanin, and Harry W. Coover, Jr., Rochester, N. Y., assignors to Eastman Kodak Company, Rochester, N. Y., a corporation of New Jersey No Drawing. Application April 6, 1948, Serial No. 19,426

5 Claims. (Cl. 260—30.6)

This invention relates to new compositions of matter and products prepared therefrom. More specifically, our invention relates to solutions of polymers of acrylonitrile, such as polyacrylonitrile and copolymers of acrylonitrile containing at least 80% acrylonitrile in the polymer molecule, and to fibers which can be spun from these solutions.

Since polymers of acrylonitrile, including both the homopolymers and copolymers thereof, are known to possess many desirable chemical and physical properties, such as insolubility in the common organic solvents, including acetone, methanol, ethanol, ethyl ether, ethyl acetate, benzene, toluene, ethylene dichloride, etc., and insensitivity to these solvents, and unusual toughness and moisture regaining properties, many attempts have been made to find solvents which could be utilized to spin these polymers into fibers. Inorganic salts, such as zinc chloride, lithium bromide and sodium sulfocyanide, have previously been proposed for this purpose, however, fibers spun by extrusion of these solutions into coagulating baths which are non-solvents for polyacrylonitrile or copolymers of acrylonitrile, such as water, dilute acid solutions, glycerol, etc., usually contain large amounts of these salts. The fibers containing these salts are not uniform and possess poor physical properties. Even where it is possible to eliminate these salts from the fiber, the fibers become weak, spongy or brittle. Some of these salts have the further undesirable property of causing the fibers to have a tacky consistency, which results in the individual filaments sticking together to give an extremely brittle, inflexible fiber having many of the characteristics of a monofilament. U. S. Patents 2,404,713 to 2,404,728 propose to use various organic compounds as solvents for polymers of acrylonitrile and show how solutions of these polymers can be used to spin fibers which do not possess the undesirable properties that result from the use of inorganic salts.

We have now found that certain organic compounds of phosphorus are useful as solvents for polymers of acrylonitrile, and that these solutions can be used to advantage in the preparation of fibers or films. It is accordingly an object of our invention to provide compounds which are useful in dissolving polymers of acrylonitrile. A further object is to provide solutions of polymers of acrylonitrile which can be advantageously used in the spinning of fibers. A still further object is to provide new organic compounds of phosphorus. Other objects will become apparent from a consideration of the following description.

The organic compounds of phosphorus which are useful in practicing our invention can be represented by the following four formulas:

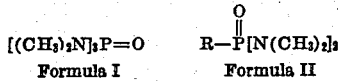

Formula I     Formula II

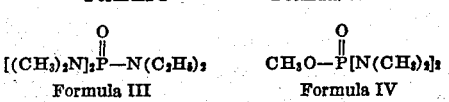

Formula III     Formula IV wherein R represents a member selected from the group consisting of an alkyl group, such as methyl, ethyl, propyl, isopropyl, etc. (i. e. an alkyl group of the formula $C_nH_{2n+1}$ wherein $n$ is a positive integer from 1 to 3), and an alkenyl group, such as vinyl, propenyl, isopropenyl, etc. (i. e. an alkenyl group of the formula $C_nH_{2n-1}$ wherein $n$ represents a positive integer from 2 to 3). While the compounds represented by Formulas I and II above are useful for dissolving both polyacrylonitrile and copolymers thereof, the compounds represented by Formulas III and IV above are only useful for dissolving copolymers of acrylonitrile containing at least 5% of another copolymerizable, unsaturated compound in the polymer molecule.

The compounds represented by Formulas I, III and IV are new compounds and have not heretofore been described in the literature. The compounds represented by Formula II where R is an alkenyl group are described in Hamilton U. S. Patent 2,382,309, dated August 14, 1945, compounds where R is a vinyl, propenyl, or isopropenyl group being disclosed. The following examples will illustrate the manner whereby we prepare the compounds represented by Formulas I, III and IV, and those of Formula II where R is an alkyl group. The general methods used below are described by Michaelis in "Annalen der Chemie," vol. 326 (1903), pp. 129 to 258.

*Example I.—Tris-dimethylaminophosphine oxide*

84.5 gms. of dimethylamine hydrochloride were slowly added to 300 gms. of phosphorus oxychloride and the mixture refluxed for 24 hours or until all of the dimethylamine hydrochloride had dissolved in the excess phosphorus oxychloride. This excess of phosphorus oxychloride was then recovered by distilling the reaction mixture under a vacuum. An almost quantitative yield of dimethylaminodichlorophosphine oxide boiling at 80 to 82° C./18 mm. was obtained.

To convert the dimethylaminodichlorophosphine oxide to the desired tris-dimethylaminophosphine oxide, the above distillate was placed in an autoclave and 270 gms. of anhydrous dimethylamine was added. The charge in the autoclave was heated with agitation at 125° C. for 24 hours. The contents of the autoclave were dissolved in 500 gms. of water, and the water solution extracted with ether. The ether extract was then dried over anhydrous sodium sulfate, and the dried ethereal solution distilled under a vacuum. After collecting the ether which distilled over first, 135 gms. of tris-dimethylaminophosphine oxide were obtained as a colorless liquid boiling at 68 to 70° C./1 mm.

The process in the above example was carried out in a stepwise manner since the initial reaction between dimethylamine hydrochloride and phosphorus oxychloride is quite vigorous and care must be taken to avoid loss of reactants or an explosion.

*Example II.—Bis-(dimethylamino)-diethylaminophosphine oxide*

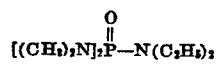

44.2 gms. of diethylamine hydrochloride were slowly added to 122.8 gms. of phosphorus oxychloride, and the mixture was refluxed for 24 hours or until all the diethylamine hydrochloride had dissolved. The reaction mixture was then distilled under vacuum and the excess phosphorus oxychloride removed as a forerun. A yield of 70 gms. of diethylaminodichlorophosphine oxide was obtained as a colorless liquid boiling at 102 to 105° C./17 mm. This product was then placed in an autoclave and 240 gms. of dimethylamine added. The mixture was heated at 125° C. with agitation for 24 hours. The contents of the autoclave were dissolved in 500 gms. of water and the aqueous solution was extracted with ether. After the ether extract had been dried over anhydrous sodium sulfate, the ethereal solution was distilled under vacuum. There were thus obtained, as a colorless liquid, 135 gms. of bis-(dimethylamino)-diethylaminophosphine oxide boiling at 68 to 70° C./1 mm.

*Example III.—N,N'-tetramethylmethanephosphonamide*

15 gms. of ethoxyphosphorusdichloride were dissolved in 60 gms. of substantially anhydrous diethyl ether. This solution was then slowly poured into a stirred solution of 18.5 gms. of anhydrous dimethylamine in 200 gms. of substantially anhydrous diethyl ether at such a rate that a gentle reflux of the ether was maintained throughout the addition. After the two solutions had been intimately mixed, the excess dimethylamine was removed as its hydrochloride by filtering. The diethyl ether was distilled off from the filtrate, and an equal volume of di-n-butyl ether added to the residue. To this solution, 46.8 gms. of methyl iodide dissolved in an equal volume of di-n-butyl ether were added. The mixture of solutions became warm and a white solid began to deposit. The reaction mixture was then heated on a steam bath until most of this white solid had dissolved, and then filtered while still hot. The di-n-butyl ether was then removed by distillation under vacuum (20 mm.) Upon distillation of the residue, 10 gms. of N,N'-tetramethylmethanephosphoramide boiling at 63 to 65° C./2 mm. were obtained.

By substituting other alkyl iodides for the methyl iodide in the above example, still other alkylphosphonamides can be obtained. For example, when a molecularly equivalent amount of propyl iodide is substituted for the methyl iodide in a molecularly equivalent amount, N, N'-tetramethylpropanephosphonamide having the formula:

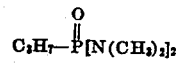

can be obtained. This series of reactions can be represented by the following general equations:

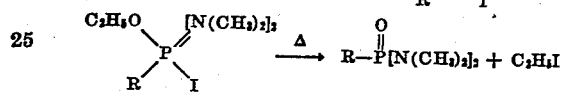

wherein R has the definition set forth above.

*Example IV.—Methoxy-bis-dimethylaminophosphine oxide*

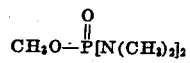

48 gms. of anhydrous methanol were slowly added to 220 gms. of phosphorus oxychloride with stirring, and the mixture was chilled in an ice bath. Carbon dioxide gas was then passed into the reaction mixture until substantially all of the free hydrogen chloride was removed. Upon distillation a good yield of methoxyphosphorusdichloride boiling at 72 to 74° C./49 mm. was obtained.

30 gms. of methoxyphosphorusdichloride, obtained as described above, were dissolved in 60 gms. of anhydrous benzene and the solution added dropwise to a stirred solution of 40 gms. of anhydrous benzene. During the period of addition the reaction mixture was externally cooled by an ice-water bath. The excess of dimethylamine which precipitated as its hydrochloride was filtered off, and the benzene removed from the filtrate by distillation under vacuum. The residue was distilled under a vacuum, and 24 gms. of methoxy-bis-dimethylaminophosphine oxide were obtained as a colorless liquid boiling at 45 to 46° C./1 mm.

It is well known in the art that by varying the catalyst concentration in a polymerization the average molecular weight of the polymer formed can be controlled. For example, an increase in the catalyst concentration usually causes a reduction in the average molecular weight, while a decrease in catalyst concentration conversely causes an increase in the average molecular weight. The presence of catalyst promoters or activators, such as sulfurous acid and its salts, or chain terminators, such as the alkyl mercaptans, also affect the average molecular weight, so that by a careful choice of polymerization conditions, polymers having intrinsic viscosities from 1.0 to 6.0 can be produced. The intrinsic viscosity as used herein is measured in a dimethylformamide solution containing 0.25% of the polymer at a temperature of 23° C., and the intrinsic viscosity ($\eta_i$) is calculated from the relationship:

$$\eta_i = \frac{2.3 \log_{10}\left(\frac{t \text{ solution}}{t \text{ solvent}}\right)}{C}$$

wherein $t$ represents the time in seconds required for a given volume of the solvent or solution to flow through an orifice, and $C$ represents the concentration of the polymer expressed in terms of per cent. It can thus be seen from the above that the intrinsic viscosity bears a direct relationship to the average molecular weight of the polymer. For the purposes of the present invention we can advantageously employ polymers or copolymers of acrylonitrile which give a viscosity within the range 2.0 to 5.0 when determined as described above.

Polymers or copolymers having an intrinsic viscosity within the range 2.0 to 5.0 can be dissolved in our organic compounds of phosphorus, and the resulting solutions can be conveniently extruded into water, or some other medium in which the polymers are insoluble at room temperature by well known means with the aid of spinnerets. The filaments, upon emerging from the coagulating bath, can be stretched in air, steam or oil at 100 to 200° C. between two rollers moving at different speeds, the second roll having a peripheral speed of from 2 to 8 times that of the first. The filament thus is stretched on the order of 100 to 700% and takes on a high luster and tenacity. Other methods of spinning which are well known in the art can be used in preparing filaments from solutions of polymers of acrylonitrile in our organic compounds of phosphorus. The following examples will illustrate the manner whereby we prepare the polymers of acrylonitrile which are useful in practicing our invention and spin fibers from solutions of these polymers of acrylonitrile in our organic phosphorus compounds.

*Example V.—Fibers spun from polyacrylonitrile dissolved in tris-dimethylaminophosphine oxide*

20 gms. of acrylonitrile, which had been freshly distilled, were added to 200 cc. of water in which had been dissolved 4 cc. of a 10% solution of hydrogen peroxide. The dispersion thus obtained was placed in a bottle equipped with a lead-lined screw cap, and shaken. The bottle was placed in a water bath and heated for 21 hours at 60° C. (±5° C.). At the end of this time a white, powdery precipitate remained in the bottle, and more water was added to the bottle. The white solid was separated from the reaction mixture by filtration, and then transferred to a hot-air oven where it was dried at 50 to 60° C. There were thus obtained 13 gms. of polyacrylonitrile in the form of a white, dry powder. When a sample of this polymer was dissolved in dimethylformamide and the viscosity of the solution determined as described above, it was found to have an intrinsic viscosity of 2.98.

2 gms. of the polyacrylonitrile, prepared as described above, were stirred into 20 cc. of tris-dimethylaminophosphine oxide, obtained according to the process of Example I, as a fine powder. The slurry so obtained was then heated at 125° C. on an oil bath, and stirred until a clear solution was obtained. This solution was then spun into fibers by the wet-spinning process according to the following method.

The above clear solution was filtered under pressure into a stainless steel chamber which had a single-hole spinneret, measuring 0.1 mm. in diameter, extending horizontally from the bottom of the chamber in such a manner that upon extrusion the filament would emerge at right angles to the chamber. The chamber was then closed, and the top thereof which was connected to a source of nitrogen gas opened to this gas supply while a pressure of 25 pounds per square inch was applied. Upon application of the pressure, the solution was extruded into a shallow bath 6 feet in length, which was placed at a right angle to the chamber, and contained water. The filament coagulated upon coming into contact with the water and was then taken up on a roller having a peripheral speed of 16 feet per minute. The filament passed from this roller through a hot air chamber heated at 170° C. and onto a wind-up drum 1 meter in circumference, which was rotating at a surface speed of 59.2 feet per minute. After the drum had made 50 revolutions an automatically controlled guide was shifted 1 inch to an adjacent position on the drum and the drum was allowed to make another 50 revolutions. This was continued until several such 50-filament bundles were obtained. These were cut from the drum and the bundles containing 50 filaments, each measuring 1 meter in length, were separately twisted to obtain several 1 meter lengths of yarn. The samples thus produced had a fine lustre and a tenacity of 3.5 gms. per denier. The elongation of the fibers was 10%.

*Example VI.—Fibers spun from a copolymer of acrylonitrile and acrylamide dissolved in diethylamino-bis-dimethyl-aminophosphine oxide*

Two solutions of freshly purified materials were made up as follows:

Solution I

|  | Grams |
|---|---|
| Acrylonitrile | 600 |
| Acrylamide | 66.8 |
| Benzoyl peroxide | 0.668 |

Solution II

|  | Cc. |
|---|---|
| Acetic acid | 500 |
| Dimethylformamide | 500 |

Solution II was placed in a 3-necked flask having ground glass joints and equipped with a mercury-sealed stirrer, reflux condenser, and an inlet tube for dry, purified nitrogen gas. One-fourth of Solution I was slowly added to Solution II with stirring, and the mixture heated at 70° C. until the reaction had started. The reaction was maintained by heating to a temperature of 60 to 80° C., and after the heat of reaction had subsided a second one-quarter portion of Solution I was added. After the heat of reaction had again subsided, the remaining portion of Solution I was added. The reaction was thus allowed to run for 18 hours, at the end of which time the 3-necked flask was immersed in a water bath heated at 60 to 80° C. and allowed to stand for an additional 72 hours. During the total period of reaction, a copolymer of acrylonitrile and acrylamide had precipitated, and this was removed from the reaction mixture by filtration. After washing with water and drying in a hot-air oven heated at 50 to 60° C., a yield of 373 gms. of copolymer in the form of a white powder was obtained. When a sample of the copolymer was dissolved in dimethylformamide and the viscosity of the solution measured as described above, it was found to have an intrinsic viscosity of 3.0.

2 gms. of the above copolymer of acrylonitrile and acrylamide were finely ground and mixed with 20 cc. of the diethylamino-bis-dimethylaminophosphine oxide, obtained according to the process described in Example II. The mixture was then heated with stirring at 130° C. until a clear solution was obtained. When this solution was spun into fibers according to the process described in Example V above, filaments having a high tenacity and fine appearance were obtained.

*Example VII.—Fibers spun from a copolymer of acrylonitrile and acrylamide dissolved in tris-dimethylaminophosphine oxide*

A portion of the copolymer of acrylonitrile and acrylamide prepared as described in Example VI, and having an intrinsic viscosity of 3.0 when dissolved in dimethylformamide as determined by the method described above, was made into a slurry, containing 10% by weight of the polymer, with tris-dimethylamino-phosphine oxide. This slurry was then heated at 90° C. with stirring until a clear viscous solution was obtained. When this solution was spun into fibers in the manner described in Example V above, filaments having good lustre and tenacity were obtained. The polymer solution was also found to be suitable for extrusion into films.

*Example VIII.—Fibers spun from polyacrylonitrile dissolved in N,N'-tetramethylmethanephosphonamide*

200 gms. of freshly distilled acrylonitrile were dissolved in 300 gms. of acetonitrile and 200 mg. of benzoyl peroxide were added. The mixture was heated at 70° C. for 60 hours and the white powder which had precipitated filtered off and washed with alcohol. After this white solid had been dried in a hot-air oven heated at 50 to 60° C. for several hours, a yield of 37 gms. of a white powder was obtained. The filtrate obtained from the polymerization reaction mixture, without washings, was treated with 5 drops of 30% acetyl peroxide in dimethyl phthalate, and the mixture heated at 70° C. for an additional 24 hours. After drying of the precipitate, so produced, in a hot-air oven heated at 50 to 60° C., there were thus obtained an additional 36 gms. of polyacrylonitrile, which with 37 gms. previously obtained, gave a total yield of 73 gms. of the polyacrylonitrile. When a sample of the polymer so obtained was dissolved in dimethylformamide and the viscosity of the resulting solution measured in accordance with the method set forth above, it was found to have an intrinsic viscosity of 3.15.

2 gms. of polyacrylonitrile, prepared as described above, were finely ground and made into a thin slurry with 20 cc. of N,N'-tetramethylmethanephosphonamide, obtained as described in Example III. The slurry was stirred and heated at 90° C., where after a short time it thickened appreciably and cleared to a yellowish viscous dope. This dope was found to be useful for the spinning of fibers according to the process described in Example V. The filaments so obtained had a high tenacity and good lustre.

*Example IX.—Fibers spun from a copolymer of acrylonitrile and acrylamide dissolved in methoxy-bis-dimethylaminophosphine oxide*

18 gms. of freshly distilled acrylonitrile were mixed with 2 gms. of freshly distilled acrylamide and the mixture dissolved in 30 cc. of a mixture of equal parts of acetic acid and dimethylformamide. After addition of 20 mg. of benzoyl peroxide, the solution was heated at 70° C. on a water bath for 19 hours. During the polymerization some copolymer of acrylonitrile and acrylamide had precipitated. The reaction mixture was then milled into acetone where the polymer was completely precipitated. After separation of the polymer by filtration, it was washed with more acetone and finally dried in a hot-air oven heated at 50 to 60° C. There were thus obtained 13.4 gms. of a copolymer of acrylonitrile and acrylamide. When a sample of this copolymer was dissolved in dimethylformamide and the viscosity of the resulting solution measured in the manner described above, it was found to have an intrinsic viscosity of 3.74.

2.2 gms. of the above copolymer were finely ground, were dispersed in 20 cc. of methoxy-bis-dimethylaminophosphine oxide, and the resulting slurry heated at 90° C. with stirring until a clear, viscous solution was obtained. When this solution was spun into fibers according to the process described in Example V above, filaments having good lustre and excellent tenacity and elongation were obtained.

*Example X.—Fibers spun from a copolymer of acrylonitrile and acrylamide dissolved in N,N'-tetramethylisopropenylphosphonamide*

2 gms. of the polymer of acrylonitrile and acrylamide prepared in Example IX above were finely ground and dispersed in 20 cc. of N,N'-tetramethylisopropenylphosphonamide, obtained as described in Hamilton U. S. Patent 2,382,309. The slurry so obtained was heated on an oil bath at 160° C. with stirring until a clear, viscous solution had been obtained. This solution remained clear on cooling to room temperature and was found to be useful for spinning into fibers according to the process described in Example V. The filaments thus obtained were lustrous and had good tenacity. This solution was also found to be useful for extrusion into films.

*Example XI.—Fibers spun from a copolymer of acrylonitrile and N-(β,β-difluoroethyl) acrylamide dissolved in N,N'-tetramethylmethanephosphonamide*

2.5 gms. of N-(β,β-difluoroethyl) acrylamide (prepared as described in the co-pending application S. N. 19,427 of J. B. Dickey and H. W. Coover, filed on even date herewith) and 7.5 gms. of acrylonitrile were dissolved in 15. cc. of a solvent made by mixing equal volumes of acetic acid and dimethylformamide. 10 mgs. of benzoyl peroxide were added and the mixture heated at 50 to 60° C. for 24 hours. There was thus obtained a powdery polymer which was separated from the reaction mixture by filtration, after which it was washed with alcohol. After drying in a hot-air oven at 50 to 60° C., 7 gms. of copolymer were obtained. Upon analysis this copolymer was found to contain 20.5% of N-(β,β-difluoroethyl) acrylamide in the polymer molecule.

2 gms. of the above copolymer were finely ground and dispersed in 20 cc. of N,N-tetramethylmethanephosphonamide. The dispersion was then heated at 90° C. with stirring for a short time until it became clear and viscous. When fibers were spun from this viscous dope according to the process described in Example V, dull, weak filaments were formed. When these filaments were stretched 500% in air heated at 180° C., they became strong, lustrous and elastic.

While our invention as described above is most advantageously applied to the preparation of solution of polyacrylonitrile, or copolymers of acrylonitrile with acrylamides, it is understood that solutions of copolymers or interpolymers of acrylonitrile with other simple, copolymerizable, unsaturated compounds can be prepared according to the processes described herein. Typical copolymerizable unsaturated compounds include vinyl acetate, vinyl chloride, acrylic acid, methyl acrylate, ethyl acrylate, propyl acrylate, isopropyl acrylate, α-methylacrylic acid, methyl α-methylacrylate, ethyl α-methylacrylate, propyl α-methylacrylate, acrylamide, α-methylacrylamide, styrene, ethylene, propylene, isobutylene, etc. While our organic phosphorus compounds can be used to prepare solutions from copolymers of substantially any range of copolymerizable unsaturated compound to the acrylonitrile, the compounds represented by Formulas I and II are mostly useful for polymers containing at least 80% acrylonitrile in the polymer molecule, while those represented by Formulas III and IV are most useful for copolymers containing from 80 to 95% of acrylonitrile in the polymer molecule.

Solutions of our polymers of acrylonitrile can also be cast in the form of films by passage from a hopper onto a rotating metallic surface under the smoothing action of a doctor knife. The solvent can be removed by any of the means known to art, as for example, by the wet method utilizing a liquid bath containing a non-solvent for the polymer. Molded articles can also be prepared by using our solutions of copolymers, or lacquers, coating materials, etc., can be prepared therefrom.

What we claim and desire secured by Letters Patent of the United States is:

1. As a new composition of matter, a polymer of acrylonitrile containing in the polymer molecule at least 80% by weight of acrylonitrile dissolved in an organic phosphorus compound selected from the group consisting of those represented by the following two formulas:

wherein R represents a member selected from the group consisting of an alkyl group of 1 to 3 carbon atoms and an alkenyl group of from 2 to 3 carbon atoms.

2. As a new composition of matter, a polymer of acrylonitrile containing in the polymer molecule at least 80% by weight of acrylonitrile dissolved in an organic phosphorus compound represented by the formula:

3. As a new composition of matter, a polymer of acrylonitrile containing in the polymer molecule at least 80% by weight of acrylonitrile dissolved in an organic phosphorus compound represented by the formula:

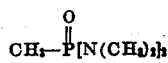

4. As a new composition of matter, homopolymeric acrylonitrile dissolved in an organic phosphorus compound represented by the formula:

5. As a new composition of matter, a copolymer of acrylonitrile and acrylamide, containing in the polymer molecule at least 80% by weight of acrylonitrile, dissolved in an organic phosphorus compound represented by the formula:

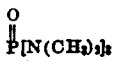

JOSEPH B. DICKEY.
THEODORE E. STANIN.
HARRY W. COOVER, JR.

REFERENCES CITED

The following references are of record in the file of this patent:

UNITED STATES PATENTS

| Number | Name | Date |
|---|---|---|
| 2,160,841 | Dreyfus | June 6, 1939 |